United States Patent
Chen

[19]

[11] Patent Number: 6,138,705
[45] Date of Patent: Oct. 31, 2000

[54] PRESSURE BALANCE VALVE USED IN A PIPE LINE

[76] Inventor: Cheng-Tung Chen, No.38, Pu Wei Lane, Tou Lun Li, Lu Kang Town, Changhua Hsien, Taiwan

[21] Appl. No.: 09/332,065

[22] Filed: Jun. 14, 1999

[51] Int. Cl.$^7$ .................................................. G05D 11/16
[52] U.S. Cl. ..................... 137/98; 137/315.11; 137/454.6
[58] Field of Search ........................ 137/98, 100, 315.05, 137/315.11, 454.6

[56] References Cited

U.S. PATENT DOCUMENTS

| | | | |
|---|---|---|---|
| 3,192,939 | 7/1965 | Moen | 137/100 |
| 4,926,897 | 5/1990 | Perrott | 137/98 |
| 4,979,530 | 12/1990 | Breda | 137/100 |

*Primary Examiner*—Stephen M. Hepperle
*Attorney, Agent, or Firm*—Rosenberg, Klein & Lee

[57] ABSTRACT

An improved pressure balance valve has a valve embodiment, a sleeve, a balance valve and a sealing cap. The balance valve is housed in the tubular sleeve which is further removably secured to the sealing cap. The sealing cap is detachably fixed to an opening of the valve embodiment so that both the balance valve and the sleeve are taken out with ease for cleansing purpose. The sleeve is provided with 3 ring grooves for housing sealing rings therein so as to effectively prevent hot and cold water from intermixing due to leakage. The balance valve is opened at both ends so as to permit water to be discharged in a better manner. Between every two ring grooves of the sleeve is defined a cold or hot water section and each water section is provided with 4 spaced cold water outer inlets or 4 spaced hot water outer inlets. The balance valve is also provided with 4 cold water inner inlets or 4 hot water inner inlets in each section divided by the partition board. The present pressure balance valve is more responsive to pressure variations and can be maintained with ease and speed.

1 Claim, 6 Drawing Sheets

PRESSURE BALANCE VALVE USED IN A PIPE LINE

BACKGROUND OF THE INVENTION

The present invention relates to an improved pressure balance valve for use in a pipeline of a common cold and hot water faucet, which is designed to prevent people from being scalded by excessively hot water in use. It has a sleeve and a pressure balance valve that are integrally assembled together so that they can be dismantled as one easily for cleansing purpose. The sleeve and balance valve are designed in such a way that water flows therethrough in a smoother and more direct manner.

In general, a conventional pressure balance valve, as shown in FIG. 1, is comprised of a valve embodiment 10, a sleeve 20, a balance valve 30, a pair of rubber stoppers 40 and a sealing cap 50. The valve embodiment 10 is of an H-shaped form having a cold water inlet 11 at the top of the right portion of the valve embodiment 10 and a hot water inlet 12 at the top of the left portion thereof. A balance valve chamber 13 is horizontally disposed at the central portion thereof. Next to the right end of the balance valve chamber 13 is disposed an enlarged cold water inlet space 131 in communication with the cold water inlet 11. Next to the left end of the balance valve chamber 13 is disposed a hot water inlet space 132 communicating with the hot water inlet 12. To the right of the middle of the balance valve chamber 13 is defined a cold water outlet space 133 which communicates with an internally threaded cold water outlet 14 disposed at the bottom of the outlet space 133. A hot water outlet space 134 is placed to the left of the middle of balance valve chamber 13 with an internally threaded hot water outlet 15 communicating with the bottom thereof. To the right side of the valve embodiment 10 is disposed an internally threaded opening 16 in communication with the balance valve chamber 13.

The sleeve 20 is a hollow tube on the right portion of which are disposed 2 rings of 4 spaced cold water inlet holes 21 and cold water outlet holes 23 respectively. On the left portion of the sleeve are identically disposed 2 rings of 4 spaced hot water inlet holes 22 and hot water outlet holes 24 respectively. The tubular balance valve 30 is divided into a cold water space 31 and a hot water space 32. At the end of the cold water space 31 and hot water space 32 is disposed a flanged countersunk cavity 311, 321 respectively. The balance valve 30 is divided into a cold water section 33 and a hot water section 34 with a partition board 35 disposed therebetween. A groove 351 is disposed on the periphery of the partition board 35 for the location of a sealing ring. On the cold water section 33 and hot water section 34 are disposed respectively a pair of symmetric cold water passage holes 331 and hot water passage holes 341. The rubber stopper 40 has a hollow interior and the sealing cap 50 has a hexagonal driving section 50 and an externally threaded stem 52 having a bottom cavity 53.

As shown in FIG. 2, the sectional diagram shows the assembly of the prior art balance valve of FIG. 1. First, the rubber stoppers 40 are stuffed into the countersunk cavities 311, 321 of the balance valve 30 respectively and then the balance valve 30 is placed in the hollow interior of the sleeve 20 which is then inserted into the balance valve chamber 13 of the valve embodiment 10 via the opening 16. The cold water inlet holes 21 and hot water inlet holes 22 are placed in the cold water inlet space 131 and hot water inlet space 132 respectively. The cold water outlet holes 23 and hot water outlet holes 24 are placed in the cold water outlet space 133 and hot water outlet space 134 respectively. At last the sleeve 20 is placed via the opening 16 and locked inside the valve chamber 13 of the valve embodiment 10 by the sealing cap 50. In use, the cold water inlet 11 and hot water inlet 12 are connected to a cold water source by a supplying pipe 1 and to a heater by a hot water supplying pipe 2. The cold water outlet 14 and hot water outlet 15 are connected to a faucet by way of a cold water discharge pipe 3 and a hot water discharge pipe 4 respectively.

Referring to FIG. 3, the operation mode of the pressure balance in the prior art balance valve is illustrated. Cold water is first led from a water source by the cold water supplying pipe 1 into the valve embodiment 10 via the cold water inlet 11. Then the cold water passes sequentially the cold water inlet space 131, the cold water inlet holes 21 of the sleeve 20, the cold water section 33 of the balance valve 30, the cold water outlet holes 23 of the sleeve 20, the cold water outlet space 133 of the valve embodiment 30, the cold water outlet 14 and it is finally discharged out of a faucet via the cold water discharge pipe 3.

Similarly, the hot water is first led from a water source by the hot water supplying pipe 2 into the valve embodiment 10 via the hot water inlet 12. Then the hot water passes sequentially the hot water inlet space 132, the hot water inlet holes 22 of the sleeve 20, the hot water section 34 of the balance valve 30, the hot water outlet holes 24 of the sleeve 20, the hot water outlet space 134 of the valve embodiment 30, the hot water outlet 15 and it is finally discharged out of a faucet via the hot water discharge pipe 4.

As the pressure of the in-flow cold water is suddenly dropped, part of the hot water will push one side of the partition board 35 of the hot water section 34 of the balance valve 30 and the side wall of the flanged countersunk cavity 321. And the other part of the hot water will flow in through the hot water inner passage hole 341 of the valve 30, and passes through the hot water space 32, the hollow interior of the rubber stopper 40 and pushes in a hot water side sliding room the balance valve 30 toward the cold water side with the cold water in the cold water sliding room squeezed to dispense slowly. It will further block hot water from entering via the hot water inlet holes 22 of the sleeve 20.

Such a prior art pressure balance valve has the following disadvantages in practical use:

1. The sleeve 20 is stuffed into the valve chamber 13 via the opening 16 of the valve embodiment 10 and the sealing cap 50 is engaged with the opening 16. If one wants to cleanse the sleeve 20 and the balance valve 30, it is relatively hard to get them out, causing inconvenience in use.
2. The outer surface of the sleeve 20 is smooth and not provided with ring grooves 351 to locate sealing rings. The sleeve 20 is placed directly inside the valve chamber 13, causing cold water and hot water to mix via penetration. The temperature of water is not precisely controlled.
3. The balance valve 30 housed in the sleeve 20 produces sliding room which will become a half vacuum state when water flows into the valve 30. As balance of pressures between cold and hot water is lost, the valve 30 can not be responsive instantly, causing hot water to flow out excessively.
4. Debris will be easily accumulated in the sliding room at both ends of the sleeve 20 as the balance valve 30 is placed therein as a result of water not flowing directly in the room.

Thus the movement of the valve 30 will be negatively influenced in long period, making the scald-proof feature of the valve less effective.

SUMMARY OF THE INVENTION

Therefore, the primary object of the present invention is to provide an improved pressure balance valve for use in a pipeline which has a sleeve housed in a balance valve chamber of a valve embodiment and removably secured to a sealing cap. Thereby, the sleeve can be readily taken out for cleansing purpose.

Another object of the present invention is to provide an improved pressure balance valve which is provided with a sleeve having 3 spaced ring grooves on the outer surface thereof for location of sealing rings so that hot water and cold water can be better prevented from being intermixed via leakage. Thus, the temperature of discharged mixture of water can be better controlled.

One further object of the present invention is to provide an improved pressure balance valve which makes water flow therein in a direct manner and has no closed area so that the same is more responsive to pressure variation in a pipeline.

One still further object of the present invention is to provide an improved pressure balance valve which has a tubular sleeve and a tubular balance valve both having opened ends so as to permit water to flow therethrough without ready accumulation of debris therein in operation. Thus, no blockage problem will happen to the pressure balance valve of the present invention.

DETAILED DESCRIPTION OF THE PREFERRED EMBODIMENTS

Figure 1:
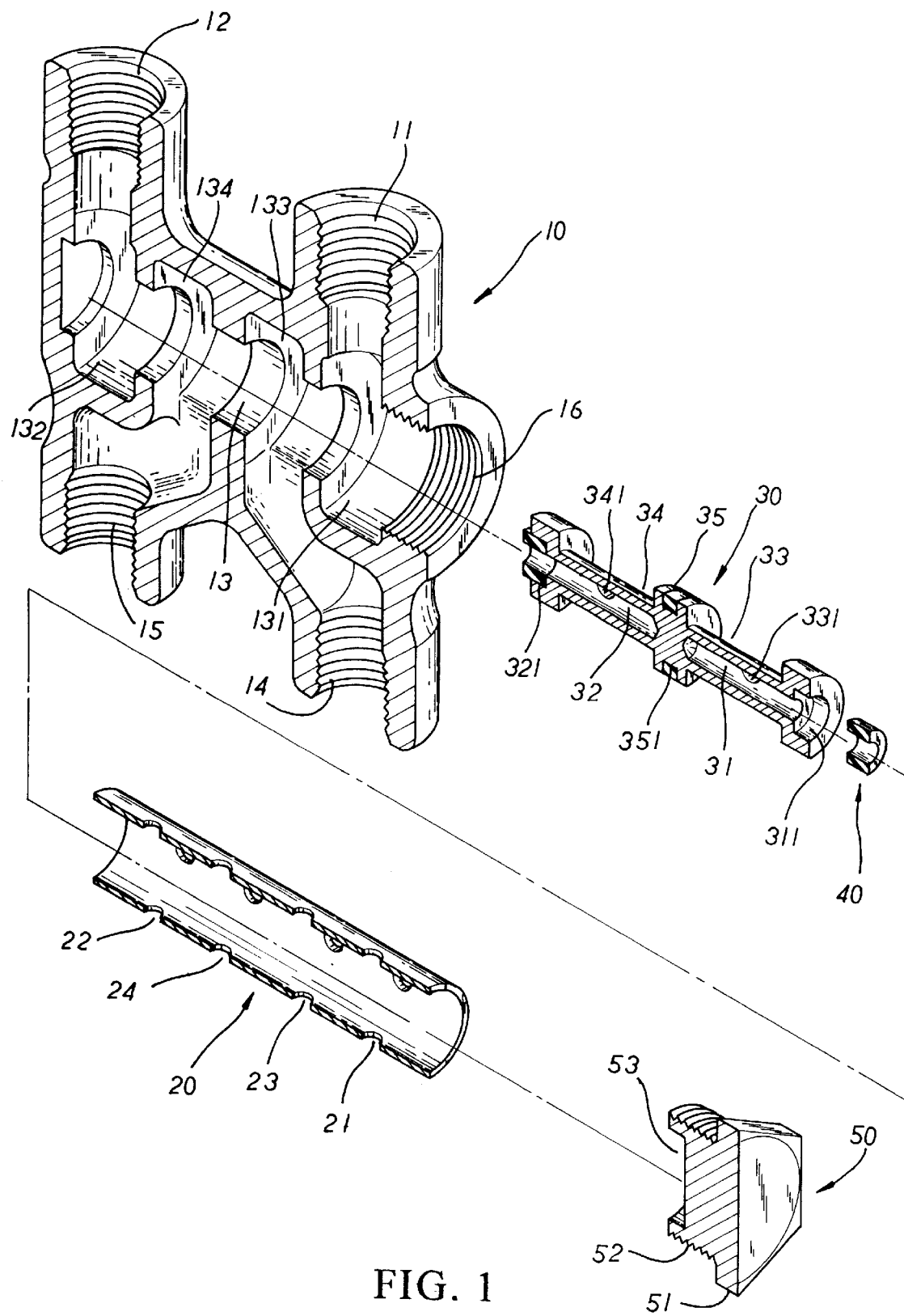
FIG. 1 is a diagram showing the pressure balance valve of a prior art.
Figure 2:
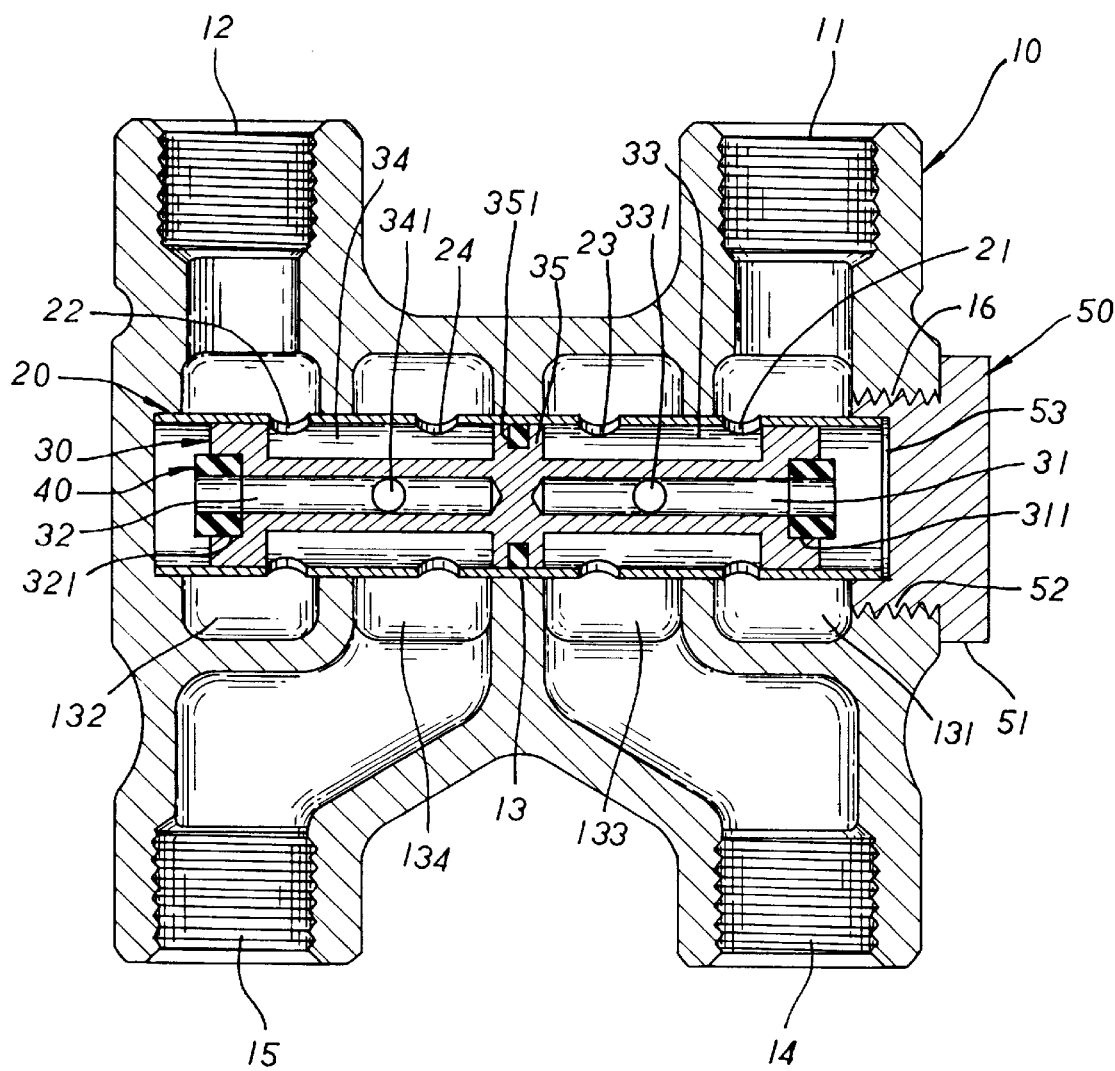
FIG. 2 is a sectional diagram showing assembly of the prior art pressure balance valve.
Figure 3:
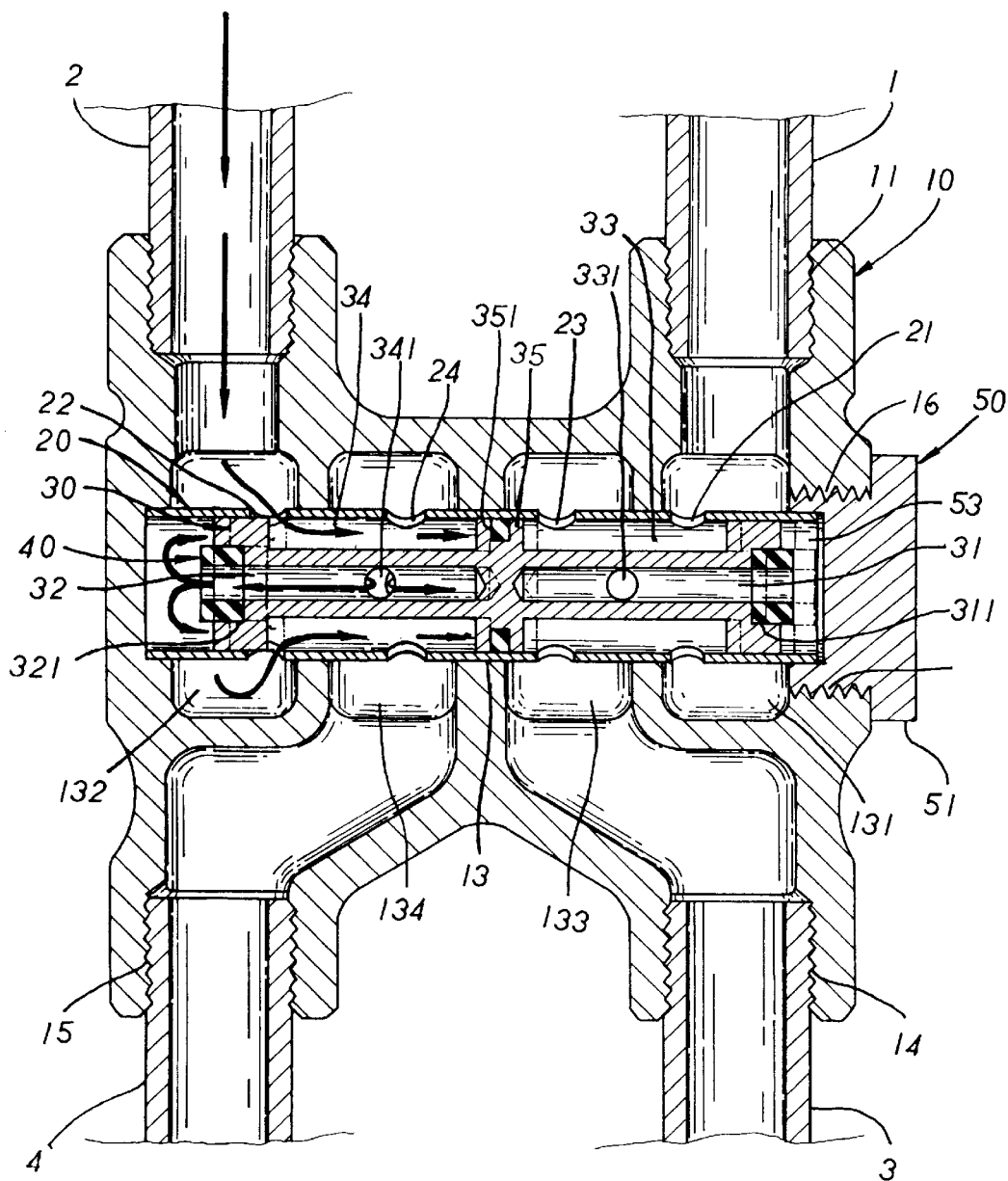
FIG. 3 is a diagram showing the operation mode of the prior art pressure balance valve.
Figure 4:
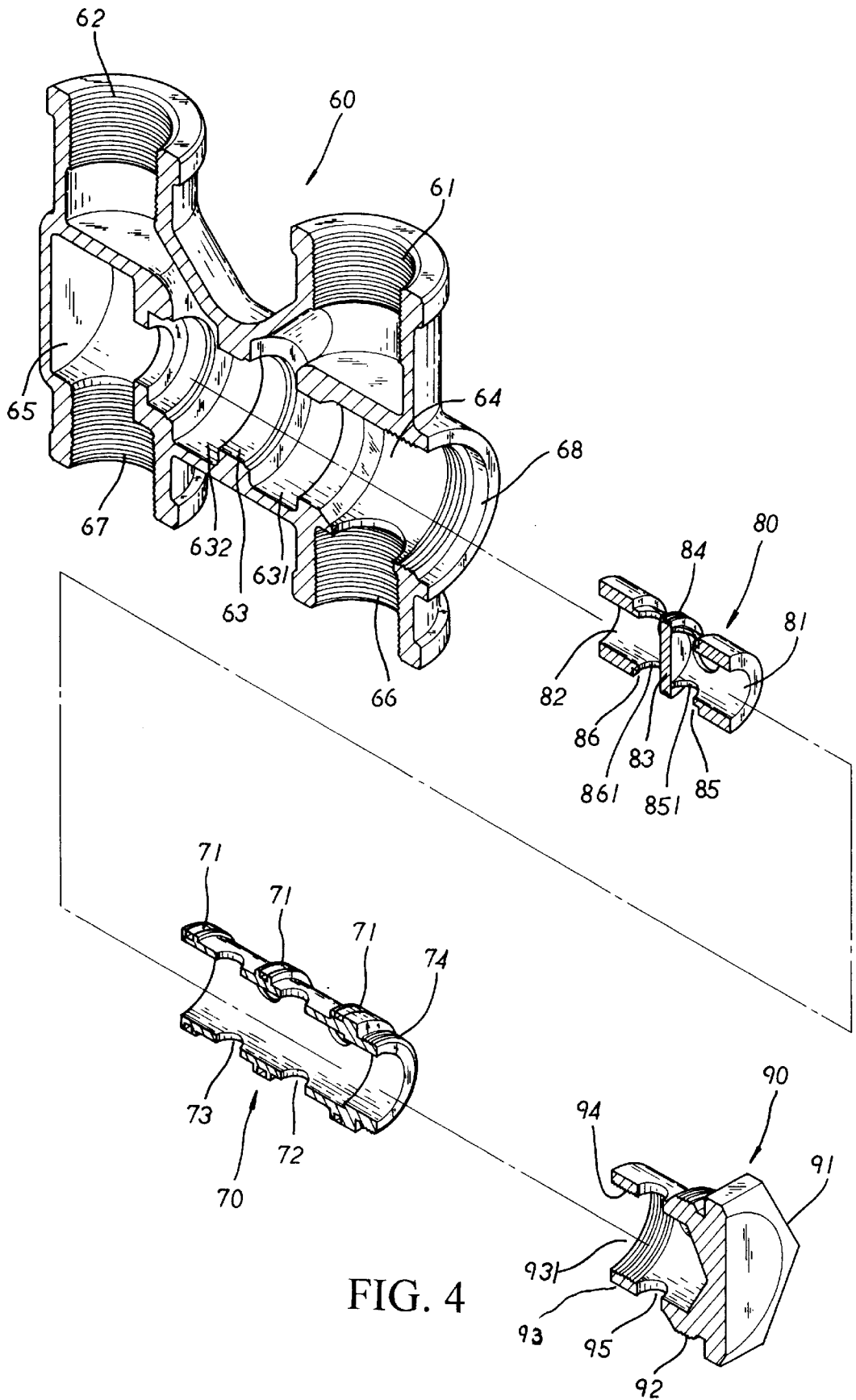
FIG. 4 is a perspective diagram showing the exploded components of the pressure balance valve of the present invention.
Figure 5:
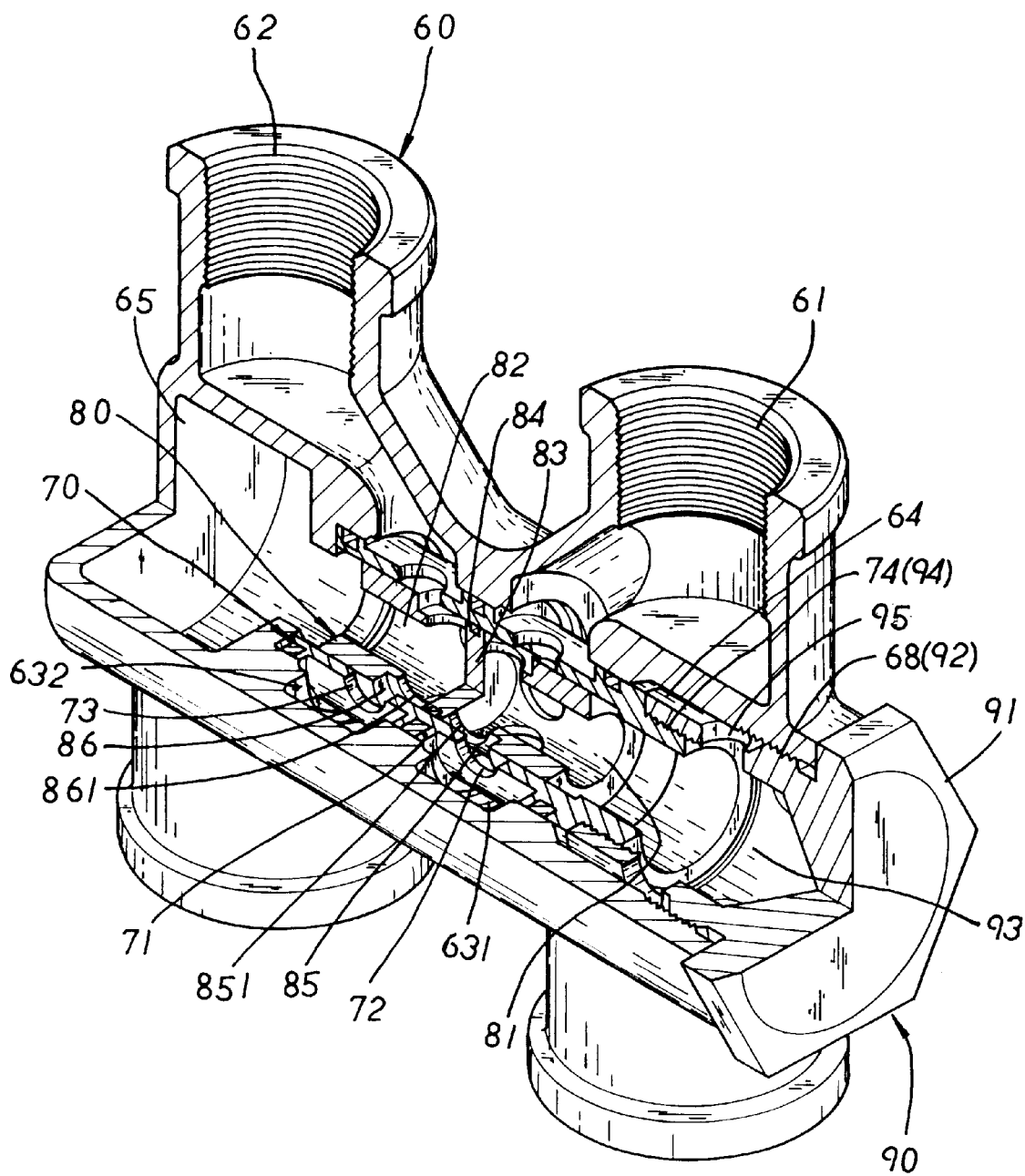
FIG. 5 is a perspective diagram showing the partially exposed view of the pressure balance valve of the present invention.

Referring to FIG. 4, the improved pressure balance valve of the present invention for use on a pipeline comprises a valve embodiment 60, a sleeve 70, a balance valve 80, and a sealing cap 90.

The valve embodiment 60 is of an H-shaped structure and has a vertically extended right and left portion. The vertical right portion has an internally threaded cold water inlet 61 at a top end thereof. The vertical left portion of the valve embodiment 60 has an internally threaded hot water inlet 62 at a top end thereof The balance valve chamber 63 extends horizontally at a central position between the vertical right portion and the vertical left portion of the H-shaped valve embodiment.

The balance valve chamber 63 has a cold water inlet space 631 and a hot water inlet space 632 at each end thereof. Each end of the balance valve chamber 63 communicates with a cold water outlet space 64 and a hot water outlet space 65 respectively.

The cold water outlet space 64 communicates with an internally threaded cold water passage 66 disposed on a bottom wall thereof. The hot water outlet space 65 has an internally threaded hot water passage 67 on a bottom wall thereof too. The valve embodiment 60 has an internally threaded sealing hole 68 in communication with the cold water outlet space 64 at one side of the vertical right portion thereof.

The sleeve 70 is a hollow cylindrical tube in which the balance valve 80 is housed. The sleeve 70 has three equally spaced ring grooves 71 on an external surface thereof for location of sealing rings ( not shown) therein. In between one of two ring grooves 71 are disposed 4 equally spaced cold water outer inlet holes 73 and in between the other two ring grooves 71 are defined 4 equally spaced hot water outer inlet holes 72 respectively. At one end of the sleeve 70 is disposed an externally threaded retaining section 74.

The sealing cap 90 is a 3-stage cylinder includes a large hexagonal driving end 91, a medium externally threaded locking section 92, and a small internally threaded connection end 93 having a hole 931 with internal retaining threads 94 defined on the inner wall of the hole.

Figure 6:
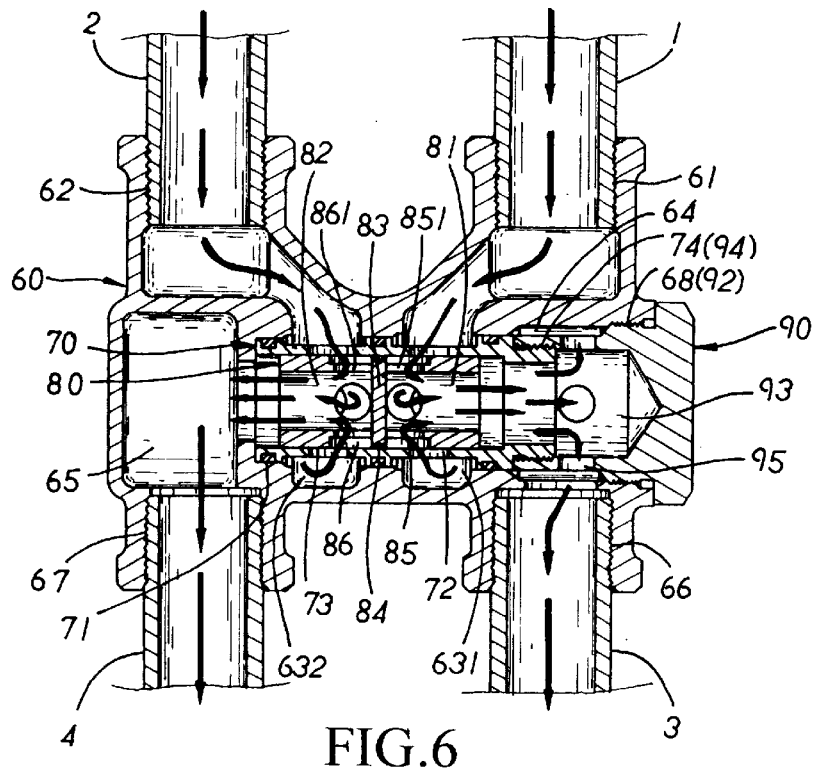
FIG. 6 is a sectional diagram showing the opened mode of the pressure balance valve of the present invention.
Figure 7:
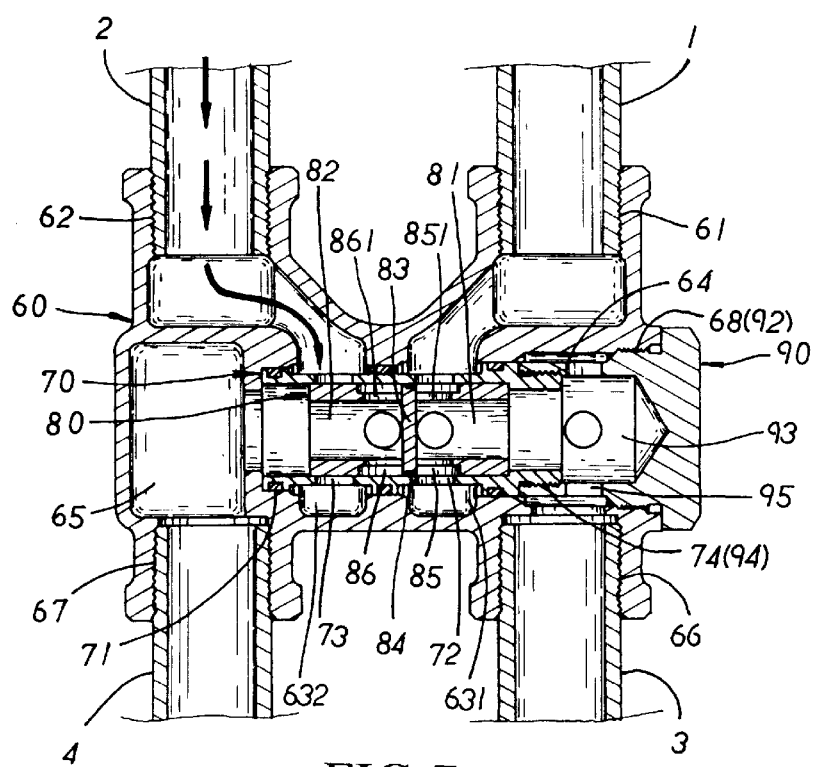
FIG. 7 is a sectional diagram showing the closed mode of the pressure balance valve of the present invention.

The cold water inlet 61 and hot water inlet 62 are engaged with a cold water supplying pipe 1 and a hot water supplying pipe 2 respectively. The cold water passage 66 and hot water passage 67 are engaged with a cold water discharge pipe 3 and a hot water discharge pipe 4 respectively, as shown in FIGS. 6, 7.

The balance valve 80 is housed in a hollow tubular interior of the sleeve 70. The sealing cap 90 is lockedly engaged with the sealing hole 68 of the valve embodiment 60. The sleeve 70 is housed in the balance valve chamber 63 of the valve embodiment 60.

In summary, the improved pressure balance valve of the present invention is characterized by the following features. The sleeve 70 has three equally spaced ring grooves 71 on an external surface thereof for location of sealing rings therein; in the area between one pair of adjacent ring grooves 71 are disposed 4 equally spaced cold water outer inlet holes and on the other two adjacent ring grooves 71 are defined 4 equally spaced hot water outer inlet holes respectively. At one end of the sleeve 70 is disposed an externally threaded retaining section 74. The balance valve 80 has a cold water hole 81 at one end and a hot water hole 82 at the other end and a partition board 83 is placed at the middle thereof; on an external surface of the balance valve 80 and in alignment with the partition board 83 is disposed a ring of groove 84 for location of a sealing ring. Next to one side of the ring of the ring groove 84 is disposed a peripheral cold water notch 85 and a peripheral hot water notch 86 to the other side of the ring groove 84. In the cold water notch 85 are disposed 4 equally spaced cold water inner inlets 851 and 4 equally spaced hot water inner inlets 861 in the hot water notch 86. The sealing cap 90 has a small internally threaded tubular connection end 93 and next to the threaded connection end 93 are disposed 4 equally spaced water outlets 95 communicating with the tubular connection end 93.

The cold water and hot water outer inlet holes 72, 73 of the sleeve 70 are located in the respective cold water inlet space 631 and hot water inlet space 632 of the balance valve chamber 63 in practical use. Besides, to get the sleeve 70 and the balance valve 80 cleaned, one only has to dismantle the sealing cap 90 from the threaded sealing hole 68 of the valve embodiment 60. Thereby the sealing cap mounted sleeve 70 and the balance valve 80 can be removed or taken out for cleansing with ease.

Referring to FIG. 6, the movement of the balance valve 80 is illustrated when a balance state of the pressures of inflow cold water and hot water is reached. As cold water flows from a source into the cold water inlet 61 via the water supplying pipe 1 and further into the cold water outer inlet holes 72 of the sleeve 70 and the cold water notch 85 of the balance valve 80 and the cold water inner inlet hole 851; and the cold water is then discharged from the cold water hole 81 of the valve 80 into the hole 931 at the connection end 93 and further to the cold water outer space 64 and the cold water outlet 66 of the valve embodiment 60 by way of the water outlets 95 of the sealing cap 90. At last the cold water is discharged via the cold water passage 66 of the valve embodiment 60 into a faucet via the cold water discharge pipe 3.

The hot water discharged from a heating device is delivered via the hot water supplying pipe 2 into the hot water inlet 62 first and then sequentially flows into the hot water outer inlet hole 73 of the sleeve 70, the peripheral hot water notch 86 of the balance valve 80 and the hot water inner inlets 861. At last, the hot water is discharged via the hot water hole 82 of the balance valve 80 into the hot water outlet space 65 of the valve embodiment 60 and flows into the hot water passage 67 and is discharged via the hot water discharge pipe 4 to a faucet.

Referring to FIG. 7, the diagram illustrates the operation mode of the pressure balance valve of the present invention when the cold water pressure is smaller than that of hot water. As the pressures of the cold water and hot water are equal, the balance valve 80 housed in the hollow interior of the sleeve 70 is positioned in an equal post. However, when the cold water pressure drops below the hot water pressure, the pressure of hot water will exert on the partition board 83 of the balance valve 80 to make the balance valve 80 move toward the cold water side, resulting in the blockage of hot water from entering the balance valve 80 via the hot water outer inlet 73 of the sleeve 70. Thus, hot water is stopped from entering the balance valve 80 so as to protect people from being scalded by hot water in use.

It can be apparently seen that the present invention has the following advantages in practical use:
1. The sleeve 70 secured to the sealing cap 90 is placed in the chamber 63 of the valve embodiment 60 with balance valve 80 housed therein so that they are easily removed for cleansing as long as the sealing cap 90 is removed.
2. On the outer surface of the sleeve are disposed 3 ring grooves 71 for location of sealing rings so that hot water and cold water can be effectively prevented from being intermixed via penetration. Thereby water temperature can be controlled in a more accurate manner.
3. The use of the partition board 83 to effect balance makes the operation smoother and more responsive without creating a closed area in practical use.
4. The opening state of the balance valve 80 at the cold water hole 81 and hot water hole 82 makes accumulation of debris in the sleeve 70 less possible so as to make the operation of a balance valve 80 smoother with less possibility of blockage.

I claim:
1. A pressure balance valve for use on a pipeline, comprising:
 a valve embodiment;
 a sleeve;
 a balance valve; and
 a sealing cap;
 said valve embodiment being of an H-shaped structure and having a vertically extended right and left portion;
 said vertical right portion having an internally threaded cold water inlet at a top end thereof;
 said vertical left portion of said valve embodiment having an internally threaded hot water inlet at a top end thereof;
 a balance valve chamber extending horizontally at a central position between said vertical right portion and said vertical left portion;
 said balance valve chamber having a cold water inlet space and a hot water inlet space at each end thereof;
 each end of said balance valve chamber communicating with a cold water outlet space and a hot water outlet space respectively;
 said cold water outlet space having an internally threaded cold water passage on a bottom wall thereof;
 said hot water outlet space having an internally threaded hot water passage on a bottom wall thereof;
 said valve embodiment having an internally threaded sealing hole at one side of said right portion thereof, communicating with said cold water outlet space;
 said sleeve being a hollow cylindrical tube;
 said sealing cap being a 3-stage cylinder including a large hexagonal driving end, a medium externally threaded locking section, and a small internally threaded connection end;
 said cold water inlet and hot water inlet being engaged with a cold water supplying pipe and a hot water supplying pipe respectively;
 said cold water outlet and hot water outlet being engaged with a cold water discharging pipe and a hot water discharging pipe respectively;
 said balance valve being housed in a hollow tubular interior of said sleeve;
 said sealing cap being lockedly engaged with said sealing hole of said valve embodiment;
 said sleeve being housed in said balance valve chamber of said valve embodiment;
 wherein said pressure balance valve is characterized by that:
  said sleeve has three spaced ring grooves on an external surface thereof for location of sealing rings therein; between every two of said ring grooves of said sleeve are disposed 4 equally spaced cold water inlet holes or 4 equally spaced hot water inlet holes respectively; and at one end of said sleeve is provided with an externally threaded retaining section;
  said balance valve has a cold water hole at one end and a hot water hole at the other end and a partition board is placed at the middle thereof, on an external surface of said balance valve and in alignment with said partition board is disposed a ring of groove for location of a sealing ring; next to one side of said ring of groove is disposed a peripheral cold water notch and a peripheral hot water notch to the other side of said ring of groove;
  in said cold water notch are disposed 4 equally spaced cold water inner inlets and 4 equally spaced hot water inner inlets in said hot water notch;
  said sealing cap has a small internally threaded tubular connection end and next to said threaded connection end are disposed 4 equally spaced water outlets communicating with said tubular connection end;
  whereby said retaining section of said sleeve is in locking engagement with said internally threaded connection end of said sealing cap with said balance valve housed in said tubular sleeve and said sealing cap is lockedly engaged with said sealing hole of said valve embodiment after said balance valve along with said sleeve is disposed inside said balance valve chamber via said sealing hole; permitting said sleeve and balance valve to be readily taken out for cleansing purpose and preventing cold water and hot water from mutually penetrating with ease.

* * * * *